(12) United States Patent
Mergler et al.

(10) Patent No.: US 7,545,853 B2
(45) Date of Patent: Jun. 9, 2009

(54) METHOD OF ACQUIRING A RECEIVED SPREAD SPECTRUM SIGNAL

(75) Inventors: Iwo-Martin Mergler, Southampton (GB); Andrew T. Yule, East Grinstead (GB); Saul R. Dooley, Horley (GB)

(73) Assignee: NXP B.V., Eindhoven (NL)

( * ) Notice: Subject to any disclaimer, the term of this patent is extended or adjusted under 35 U.S.C. 154(b) by 594 days.

(21) Appl. No.: 10/570,446

(22) PCT Filed: Sep. 6, 2004

(86) PCT No.: PCT/IB2004/051693

§ 371 (c)(1),
(2), (4) Date: Mar. 2, 2006

(87) PCT Pub. No.: WO2005/024453

PCT Pub. Date: Mar. 17, 2005

(65) Prior Publication Data

US 2007/0019713 A1 Jan. 25, 2007

(30) Foreign Application Priority Data

Sep. 9, 2003 (GB) ................... 0320993.9

(51) Int. Cl.
H04L 27/30 (2006.01)
(52) U.S. Cl. ................... 375/150; 375/343; 375/367; 375/368; 370/506

(58) Field of Classification Search ............... 375/150, 375/152, 343, 367, 368; 370/506, 509, 510, 370/515, 479; 704/216, 218
See application file for complete search history.

(56) References Cited

U.S. PATENT DOCUMENTS

| 5,151,919 | A  | * | 9/1992 | Dent ........................ 370/209 |
| 5,550,443 | A  | * | 8/1996 | Lee .......................... 315/383 |
| 5,905,765 | A  | * | 5/1999 | Snodgrass ................. 375/346 |
| 6,606,346 | B2 | * | 8/2003 | Abraham et al. ........... 375/142 |
| 6,771,688 | B1 | * | 8/2004 | Lee et al. .................. 375/142 |
| 7,061,912 | B1 | * | 6/2006 | Anandakumar et al. .... 370/392 |
| 7,411,985 | B2 | * | 8/2008 | Lee et al. .................. 370/352 |

OTHER PUBLICATIONS

International Search Report for PCT/IB2004/051693; mailed Jun. 12, 2004.*

* cited by examiner

*Primary Examiner*—Dac V Ha

(57) ABSTRACT

A method of acquiring a received spread spectrum signal, especially a GPS signal, is disclosed together with a spread spectrum signal receiver and a cellular telephone incorporating such a receiver. The method comprises the steps of: providing a replica signal containing a pseudorandom noise code, corresponding to that of the spread spectrum signal; providing a subject signal containing two fragments of the spread spectrum signal initially received during respective time periods between which a further time period elapses; and coherently correlating the replica signal with the subject signal over the two fragments.

13 Claims, 3 Drawing Sheets

METHOD OF ACQUIRING A RECEIVED SPREAD SPECTRUM SIGNAL

This invention relates to a method of acquiring a received spread spectrum signal, especially a GPS signal, together with a corresponding spread spectrum signal receiver and a cellular telephone comprising a cellular communications transmitter/receiver unit and such a spread spectrum signal receiver.

In accordance with the present invention, such a method, receiver and cellular telephone are provided, the method comprising the steps of: providing a replica signal containing a pseudorandom noise code corresponding to that of the spread spectrum signal; providing a subject signal containing two fragments of the spread spectrum signal initially received during respective time periods between which a further time period elapses; and coherently correlating the replica signal with the subject signal over the two fragments.

Enabling a spread spectrum receiver to coherently correlation over a signal discontinuity enables such a receiver to better acquire spread spectrum signals, especially if a particularly signal acquisition is inherently difficult because of say received signal strength, signal interference or multipath distortion.

The method may further comprise the step of measuring the relative timing of the receipt of the two fragments in which case, the subject signal may be provided containing the two fragments one immediately following the other and the replica signal may be provided with a discontinuity corresponding to the time period elapsed between the respective time periods in which the two fragments are initial received.

Alternatively, the method may further comprise the step of inserting dummy data, e.g. white noise, in the subject signal between the two fragments wherein the amount of dummy data inserted corresponds to the time period elapsed between the respective time periods in which the two fragments are initial received; and wherein the correlation includes the dummy data.

A spread spectrum employing such a method may receive the spread spectrum signal unfragmented but experience subsequent fragmentation inadvertently, occurring prior to correlation due to performance limitations of the receiver. In particular, this may be caused by buffer under run or the inability of a busy processor to service the receiver promptly. The latter may be especially relevant to a cellular telephone comprising such a spread spectrum signal receiver together with a cellular communications transmitter/receiver unit if a processor normally used to service the spread spectrum receiver is busy servicing the cellular communications transmitter/receiver unit.

Alternatively such fragmentation may be intentional and caused by temporarily disabling part of the receiver.

Again, in the context of a cellular telephone comprising such a spread spectrum signal receiver together with a cellular communications transmitter/receiver unit, part of the spread spectrum signal receiver may be intentionally disabled during a period coinciding with activity of the cellular communications transmitter/receiver unit.

The present invention will now be described, by way of example only, of an embodiment of a mobile cellular telephone comprising a GPS receiver for use in a cellular telephone network with reference to the accompanying schematic drawings in which.

Figure 1:
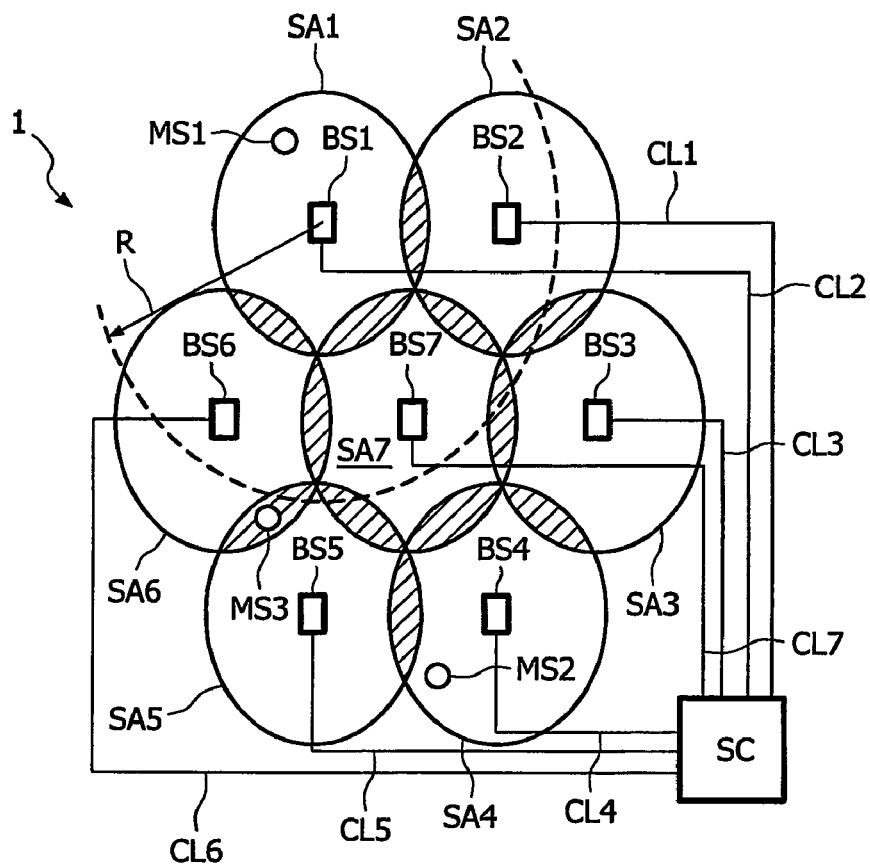
FIG. 1 shows the geographic layout of a cellular telephone network.

The geographical layout of a conventional cellular telephone network 1 is shown schematically in FIG. 1. The network comprises a plurality of base stations BS of which seven, BS1 to BS7, are shown, situated at respective, mutually spaced geographic locations. Each of these base stations comprises the entirety of a radio transmitter and receiver operated by a trunking system controller at any one site or service area. The respective service areas SA1 to SA7 of these base stations overlap, as shown by the cross hatching, to collectively cover the whole region shown. The system may furthermore comprise a system controller SC provided with a two-way communication link, CL1 to CL7 respectively, to each base station BS1 to BS7. Each of these communication links may be, for example, a dedicated land-line. The system controller SC may, furthermore, be connected to a the public switched telephone network (PSTN) to enable communication to take place between a mobile cellular telephone MS1 and a subscriber to that network. A plurality of mobile cellular telephones MS are provided of which three, MS1, MS2 and MS3 are shown, each being able to roam freely throughout the whole region, and indeed outside it.

Figure 2:
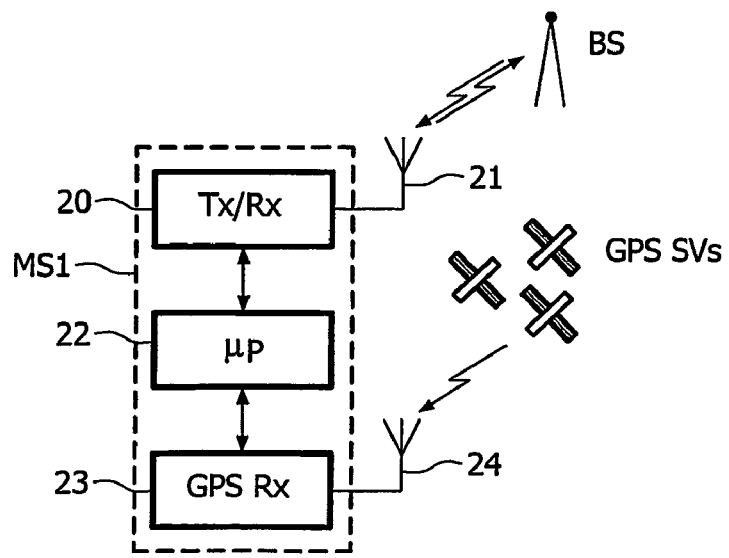
FIG. 2 shows mobile cellular telephone MS1 of FIG. 1 in greater detail.

Referring to FIG. 2, telephone MS1 is shown in greater detail comprising a communications transmitter (Tx) and receiver (Rx) 20 connected to a communications antenna 21 and controlled by a communications microprocessor (µp) 22 for communication with the base station BS with which it is registered.

In addition to the conventional components of a mobile telephone, telephone MS1 further comprises a GPS receiver (GPS Rx) 23 connected to a GPS antenna 24. When operative, the GPS receiver receive NAVSTAR SPS GPS signals and pre-processes them, typically by passive bandpass filtering in order to minimize out-of-band RF interference, preamplification, down conversion to an intermediate frequency (IF) and analog to digital conversion. The resultant, digitised IF signal remains modulated, still containing all the information from the available satellites, and is fed into a memory (not shown) of the communications microprocessor (µp) 22. The communications microprocessor is configured to acquire and track GPS signals for the purpose of deriving pseudorange information from which the location of the mobile telephone can be determined using conventional navigation algorithms.

Such methods for GPS signal acquisition, tracking and position determination are well known, for example, GPS Principles and Applications (Editor, Kaplan) ISBN 0-89006-793-7 Artech House. Also, the design and manufacture of telephones of the type of telephone MS1 are well known and those parts which do not directly relate to the present invention will not be elaborated upon here further.

In accordance with the present invention, incoming GPS signals are acquired as illustrated in the following example scenarios:

EXAMPLE 1

Referring to FIG. 2, suppose as part of mobile telephones MS1 registration with base station BS1, mobile telephone MS1 engages in 2-way communication with base station BS1 using its communications microprocessor (µp) 22 for a short 10 ms period every second; and further suppose that the user has instructed mobile telephone MS1 to use its GPS receiver to determine its position.

Figure 3:
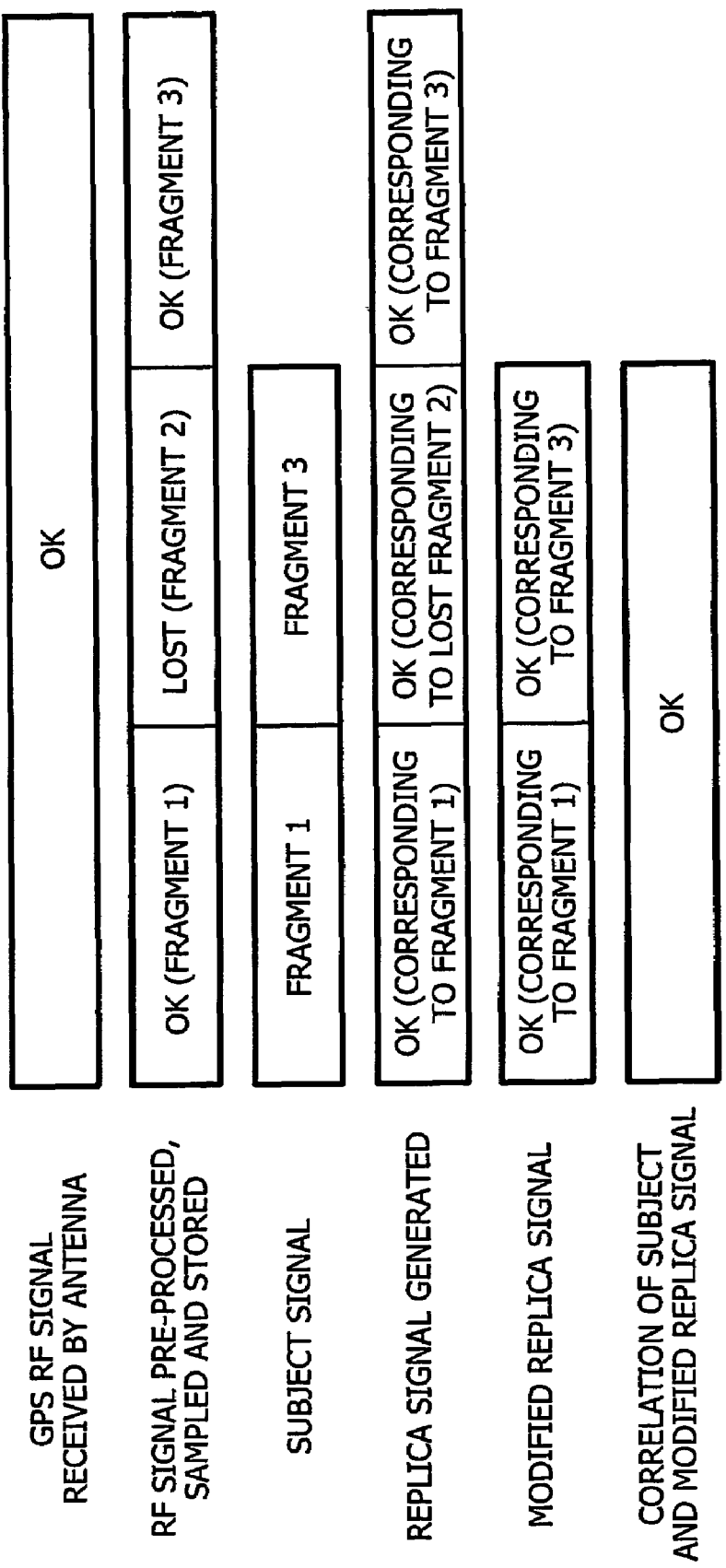
FIGS. 3 and 4 illustrate two examples of GPS signal acquisition, both in accordance with the present invention, in mobile cellular telephone MS1.
Figure 4:
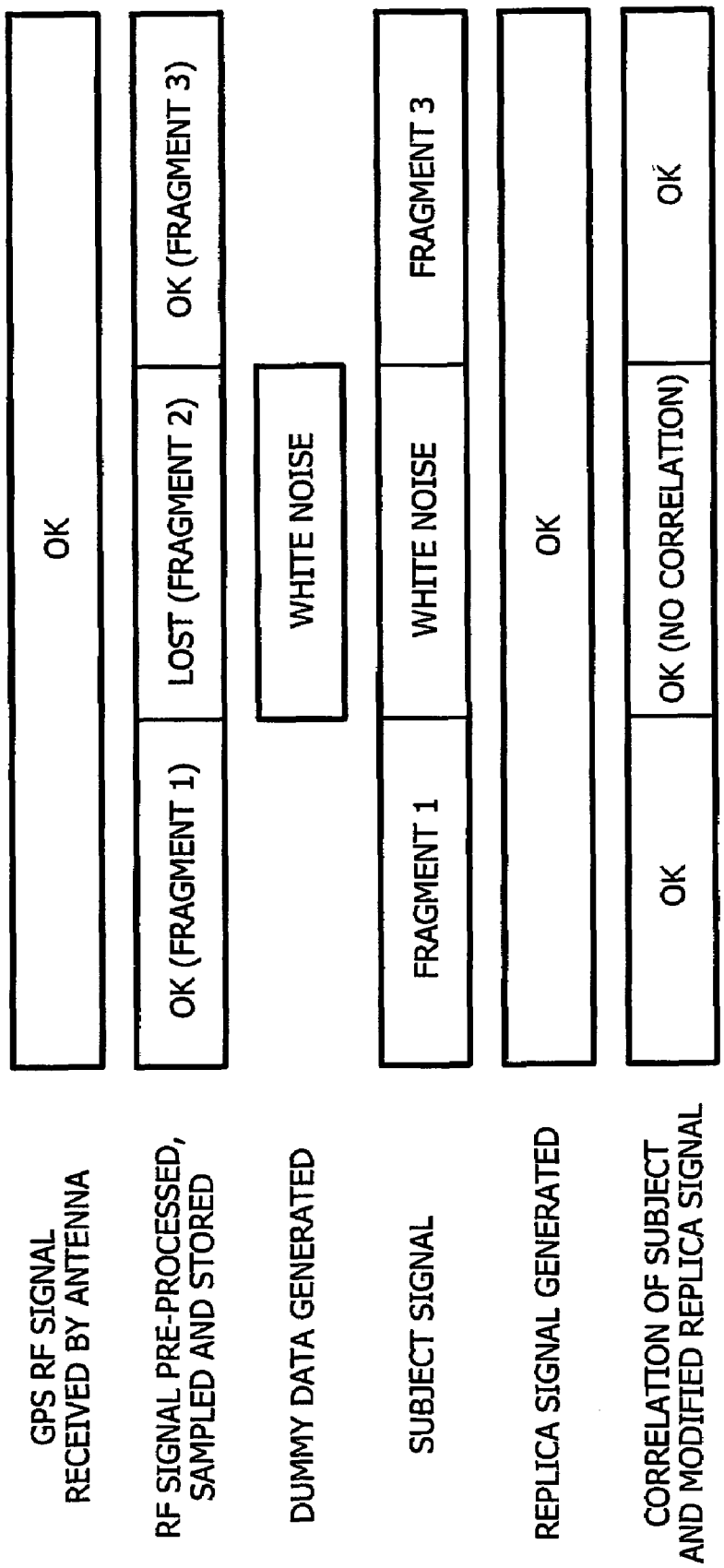

Referring to FIG. 3, upon said instruction, the GPS receiver receives a GPS RF signal through its antenna continuously, and this signal is pre-processed, sampled and stored. Fragments 1 and 3 are pre-processed, sampled and stored successfully, however, at the time when fragment 2 was being pre-processed, sampled and stored, the GPS microcontroller was unable to interface with the communications microcontroller which was busy engaging in the aforementioned periodic 2-way communication with base station BS1. Fragment 2 is lost. To accommodate for this, a subject signal is composed of fragment 1 followed immediately by fragment 3.

As is conventional, a replica signal is generated containing a pseudorandom noise code corresponding to that of the GPS signal which is intended to be acquired. This signal is then modified to omit a portion of a length corresponding to that of lost fragment 2. The subject signal and the modified replica signal are then correlated for the purposes of determining whether the target GPS signal has been acquired or not.

EXAMPLE 2

As example 1 except that instead of composing the subject signal from fragment 1 followed immediately by fragment 3, the portion of the memory that would have otherwise stored lost fragment 2 is stuffed with white noise generated by the communications microprocessor. The subject signal can then be correlated with an modified replica signal for the purposes of determining whether the target GPS signal has been acquired or not. Instead of generating white noise, a predefined pseudorandom code or a part of repetitions thereof could have been used for stuffing.

In the above examples, the coherent correlation occurs over a single fragmentation whereas it could of course occur over multiple fragmentations using the underlying principle of the present invention.

Also, in the above examples, all the GPS processing is done in the mobile telephone's GPS receiver and communications microprocessor. However, the GPS processing could equally have been distributed, for example, were the GPS RF signal received by the mobile phone's GPS receiver to be recorded and transmitted back to the cellular telephone network's system controller for subsequent processing. In such an event, an inperfect relay of a recorded GPS signal may lead to fragmentation as addressed by the present invention.

From a reading of the present disclosure, other modifications will be apparent to the skilled person and may involve other features which are already known in the design, manufacture and use of GPS receivers and component parts thereof and which may be used instead of or in addition to features already described herein.

The invention claimed is:

1. A method of acquiring a spread spectrum signal in a cellular telephone, the method comprising:
   providing a replica signal containing a pseudorandom noise code corresponding to that of the spread spectrum signal;
   providing a subject signal containing two fragments of the spread spectrum signal initially received during respective time periods between which a further time period elapses;
   using a communications microprocessor to insert white noise as dummy data in the subject signal between the two fragments; and
   coherently correlating the replica signal with the subject signal over the two fragments.

2. The method of claim 1, further comprising:
   measuring relative timing of receipt of the two fragments, wherein the subject signal is provided containing a first fragment and a second fragment, the second fragment immediately following the first fragment; and
   wherein the replica signal is provided with a discontinuity corresponding to the further time period elapsed between the respective time periods in which the two fragments are initially received.

3. The method of claim 1,
   wherein an amount of the dummy data inserted corresponds to the further time period elapsed between the respective time periods in which the two fragments are initially received; and
   wherein the correlation includes the dummy data.

4. A cellular telephone comprising:
   a Global Positioning System (GPS) antenna that receives a spread spectrum signal; and
   a spread spectrum signal receiver,
   wherein the spread spectrum signal receiver is configured to acquire the received spread spectrum signal by:
   providing a replica signal containing a pseudorandom noise code corresponding to that of the received spread spectrum signal;
   providing a subject signal containing two fragments of the spread spectrum signal initially received during respective time periods between which a further time period elapses;
   inserting white noise as dummy data in the subject signal between the two fragments; and
   coherently correlating the replica signal with the subject signal over the two fragments.

5. The telephone of claim 4,
   wherein relative timing of receipt of the two fragments is measured; wherein the subject signal contains a first fragment and a second fragment, the second fragment one immediately following the first fragment; and
   wherein the replica signal is provided with a discontinuity corresponding to the further time period elapsed between the respective time periods in which the two fragments are initially received.

6. The telephone of claim 4,
   wherein the subject signal contains the dummy data inserted between the two fragments which corresponds to the further time period elapsed between the respective time periods in which the two fragments are initially received; and
   wherein the correlation includes the dummy data.

7. The telephone of claim 4,
   wherein the spread spectrum signal is received unfragmented; and
   wherein subsequent fragmentation is inadvertent, occurring prior to correlation due to performance limitations of the spread spectrum signal receiver.

8. The telephone of claim 7,
   wherein the subsequent fragmentation is caused by buffer under run.

9. The telephone of claim 7,
   wherein the subsequent fragmentation is caused by inability of a busy processor to service the spread spectrum signal receiver promptly.

10. The telephone of claim 4,
    wherein the subsequent fragmentation is intentional and caused by temporarily disabling part of the spread spectrum signal receiver.

11. The telephone of claim 4, further comprising:
    a cellular communications transmitter/receiver unit.

12. The telephone of claim 11,
wherein the spread spectrum signal is received unfragmented; and
wherein subsequent fragmentation is inadvertent, occurring prior to correlation due to a processor normally used to service the spread spectrum receiver being busy servicing the cellular communications transmitter/receiver unit.

13. The telephone of claim 11,
wherein subsequent fragmentation is intentional and caused by temporarily disabling part of the spread spectrum signal receiver during a period coinciding with activity of the cellular communications transmitter/receiver unit.

* * * * *